(12) United States Patent
Miller et al.

(10) Patent No.: US 7,628,064 B1
(45) Date of Patent: Dec. 8, 2009

(54) ULTRASONIC HEIGHT AND VOLUME MEASURING INSTRUMENT FOR LABORATORY TEST CONTAINERS

(76) Inventors: David Miller, 2500 Dean Lesher Dr., Concord, CA (US) 94520; William M. Hess, 130 Marston Ave., San Francisco, CA (US) 94121

( * ) Notice: Subject to any disclaimer, the term of this patent is extended or adjusted under 35 U.S.C. 154(b) by 282 days.

(21) Appl. No.: 11/656,074

(22) Filed: Jan. 19, 2007

Related U.S. Application Data

(60) Provisional application No. 60/762,928, filed on Jan. 27, 2006.

(51) Int. Cl.
*G01F 17/00* (2006.01)
(52) U.S. Cl. .......................................... 73/149; 422/63
(58) Field of Classification Search .................. 73/149; 422/63
See application file for complete search history.

(56) References Cited

U.S. PATENT DOCUMENTS

| | | | | |
|---|---|---|---|---|
| 5,273,517 A | * | 12/1993 | Barone et al. | 494/37 |
| 5,311,908 A | * | 5/1994 | Barone et al. | 137/881 |
| 5,880,364 A | * | 3/1999 | Dam | 73/149 |
| 6,331,437 B1 | * | 12/2001 | Cohen et al. | 436/43 |
| 6,426,043 B1 | * | 7/2002 | Cohen et al. | 422/63 |
| 6,426,044 B1 | * | 7/2002 | Cohen et al. | 422/63 |
| 6,426,228 B1 | * | 7/2002 | Cohen et al. | 436/47 |
| 6,444,472 B1 | * | 9/2002 | Cohen et al. | 436/47 |
| 6,451,259 B1 | * | 9/2002 | Cohen et al. | 422/63 |
| 6,489,169 B1 | * | 12/2002 | Cohen et al. | 436/47 |
| 2005/0194237 A1 | * | 9/2005 | Veiner | 198/619 |

* cited by examiner

*Primary Examiner*—Hezron Williams
*Assistant Examiner*—Rodney T Frank
(74) *Attorney, Agent, or Firm*—Richard Esty Peterson, Esq.

(57) ABSTRACT

Automated laboratory apparatus for determining the volume of liquid samples contained in the cavities of laboratory sample collectors, such as well trays or tube racks, the apparatus having an ultrasonic height measuring instrument and a processor for calculating the volume of liquid in a particular sample container from the measured height, the apparatus also having a robotic displacement mechanism that selectively positions an ultrasonic height measuring sensor above a select sample container in the well tray or tube rack for measuring the height of liquid in the container, comparing the measured height to the height of the bottom of an empty container and calculating the volume of liquid in that container.

12 Claims, 3 Drawing Sheets

ULTRASONIC HEIGHT AND VOLUME MEASURING INSTRUMENT FOR LABORATORY TEST CONTAINERS

RELATED APPLICATION

This application claims the benefit of U.S. Provisional Application Ser. No. 60/762,928, of the same title, filed Jan. 27, 2006.

BACKGROUND OF THE INVENTION

This invention relates to laboratory apparatus for the automated measuring of the volume of liquid in sample containers arranged in sets, such as sample tubes in tube racks and sample wells in well trays. In particular, the apparatus utilizes an ultrasonic sensor to detect the height of liquid in a tube cavity or well cavity and determine the volume from an algorithm that calculates the volume from the shape of the cavity and the height of the liquid surface from the bottom of the cavity. The automated measuring apparatus includes optional auxiliary sensors, such as a camera, to visually inspect and record the status of a cavity or the identity of a sample or samples from a marking adjacent the cavity or on a surface covering the cavity.

A primary object of this invention is to create an automated measuring device for a variety of laboratory containers for the purpose of quality assurance, sample management and other purposes.

The method of this invention is to take the automated measurement of the volume of various laboratory racks and plates or other grouped containers by use of an ultrasonic transducer being passed over the associated cavity position to measure the height of matter in the cavity which would then be interpolated to indicate the volume of the material in the particular cavity.

While typical laboratory racks and plates or other sets of grouped containers are frequently positioned based on standard spacing, there is no requirement that they be so spaced for the automated measuring system of this invention. Many standard plates and racks are based on a matrix of 98 or 384 wells or tubes. Non standard or random spacing could be addressed by the invented device as well by appropriate programming.

This device would provide an accurate method of collecting interpolated volume data in a rapid fashion.

Other methods currently in use to establish volumes and or weights of tubes or racks containing tubes or containers are to weigh each associated tube or container. Assuming that the tube had been previously tare weighted, the weight of the contents could be determined. However, with laboratory well plates or trays there is no easy solution. The wells are customarily formed as part of the plate and do not have removable containers. As such, individual cavities cannot be removed to be measured for volume or weight. The automated measuring device of this invention solves this problem by measuring the liquid level in the cavity.

SUMMARY OF THE INVENTION

The ultrasonic height and volume measuring instrument of this invention is an automated laboratory apparatus for determining the volume of liquid samples contained in the cavities of laboratory sample collectors, such as well trays or tube racks. In addition, the automated laboratory apparatus optionally includes an imaging device, such as a digital camera, to capture an image of the contents of a cavity or a marking on or adjacent to a cavity. The imaging device can also capture a marking, such as a bar code, on the sample container to identify the rack or tray or determine the orientation of the rack or tray.

There are two typical operations required to accurately determine the volume of material in a particular well cavity. First, is to establish the height measurement of each empty well cavity. Then, measure the same well cavity after the material is placed into the well cavity. This will establish the physical vertical dimension of the liquid. For volume, it would be necessary to use a calculation factor established for each type of cavity to be measured since the cavities are usually not constructed of parallel sides and flat bottoms, but rather of some variation of a conical shape. The same procedure can be applied to test tubes in a rack.

Mechanically, to measure the individual containers in a rack or tray, the rack or tray would be placed in a fixture on a support carrier. Upon electronic signal, the carrier would retract into the machine to align a sensor over the first row. The sensor would travel transversely over the row, taking height measurements over each of the cavities. Once the row is complete, the support carrier would further retract into the machine and the sensor would again travel over the next row, taking the next set of measurements and so on until all rows would have been measured. Once all measurements have been completed, the support carrier will fully extend for removal of the rack or tray. The measurements could be taken in the retraction motion, extension motion, or a combination of both.

The particular methodology described is only one example as the sequence of measurement can be programmed for any specified pattern. For instance, instead of addressing rows, the device could be configured to address the columns at right angle to the rows or any other regular or random sequence that the user required.

Multiple passes for confirming minimum heights may be desirably to avoid a false reading which could, for example, be caused by a drop on the side of a container and not the actual bottom of the cavity. These passes might be in a predetermined pattern or could be deliberately set to be random for quality assurance purposes.

Possible modes:
X direction of or Y direction only;
XYZ combination;
Bi-directional; and,
Multiple sensors for increased speed or other uses.

Sensors may detect:
The presence of a rack or tray;
Proper insertion of the rack or tray; and,
Bar code and/or RFID reader for the rack or tray.

Applications:
Automated measuring of heights and volumes in cavities;
Automated checking for caps and cap insertion; and,
Other detection operations such as the absence of a tube in a tube rack.

DETAILED DESCRIPTION OF THE PREFERRED EMBODIMENTS

Figure 1:
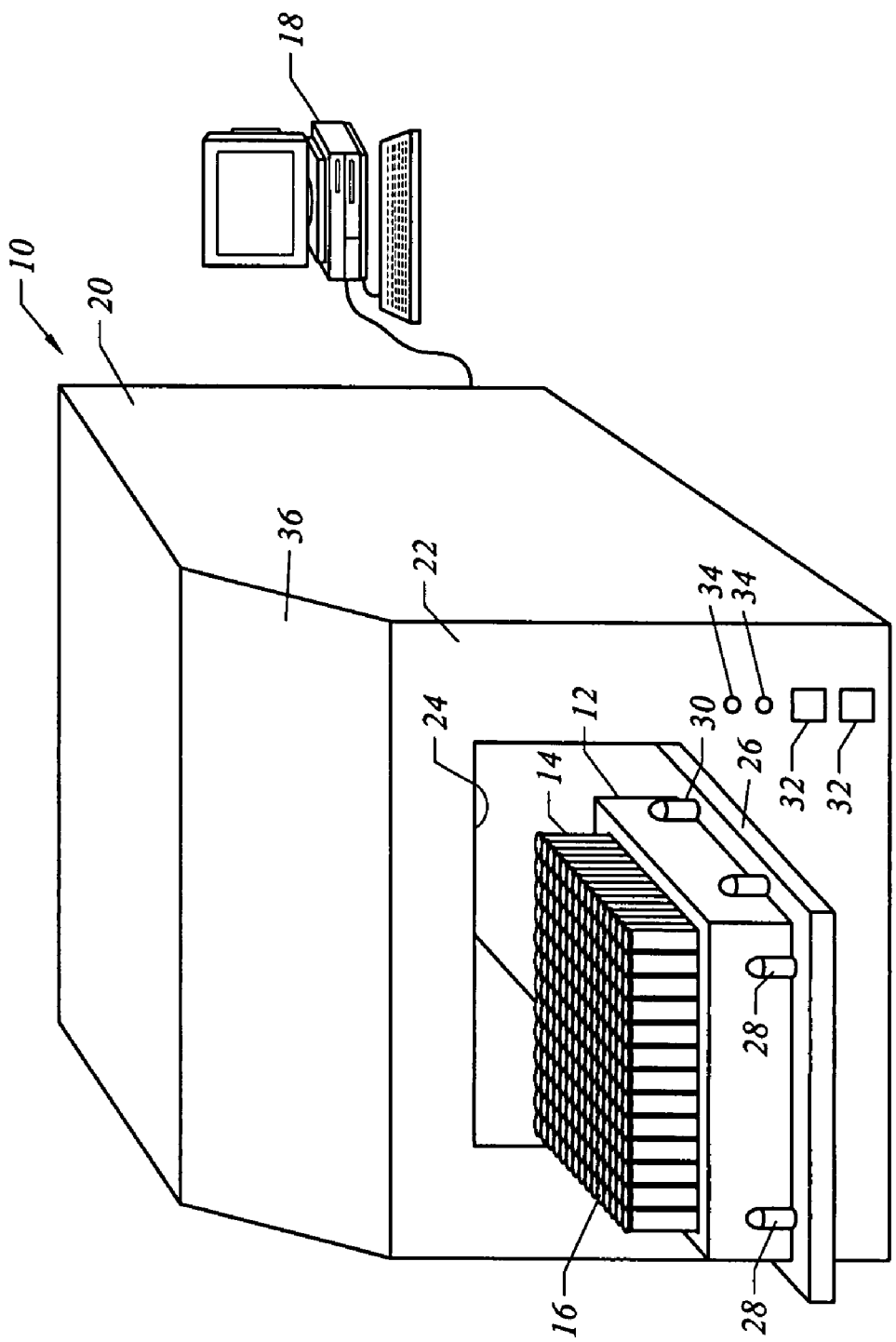
FIG. 1 is a perspective view of the ultrasonic test instrument.

Referring to FIG. 1, the ultrasonic test instrument is designated by reference numeral 10 and is shown as a compact desktop device with a standard tube rack 12 holding a plurality of test tubes 14 some of which have tube caps 16. The test instrument 10 is preferably designed to operate with a conventional personal computer 18 that functions as a convenient input and output device. When programmed with an application program, the computer carries out the desired operations and records the necessary data for use. It is to be understood that with the addition of an appropriate conventional display control panel and internal processor, the test instrument can be a stand-alone device.

The test instrument 10 has a housing 20 providing a protective enclosure with a front 22 having an opening 24 with an extendable and retractable platform carrier 26 adapted to seat a tube rack 12, as shown, or a typical well tray (not shown). The rack 12 is positioned on the platform carrier 26 by retainer pegs 28 which are located in selected positioning holes 30 for the particular multi-cavity sample collector, such as a tube rack or well tray.

On the front 22 of the housing 20 are basic control switches 32 and indicator lamps 34 for "on" and "operating." The housing front 22 has a sloped portion 36 that provides a convenient mounting surface for other operating controls and displays for a stand-alone device as noted.

Figure 2:
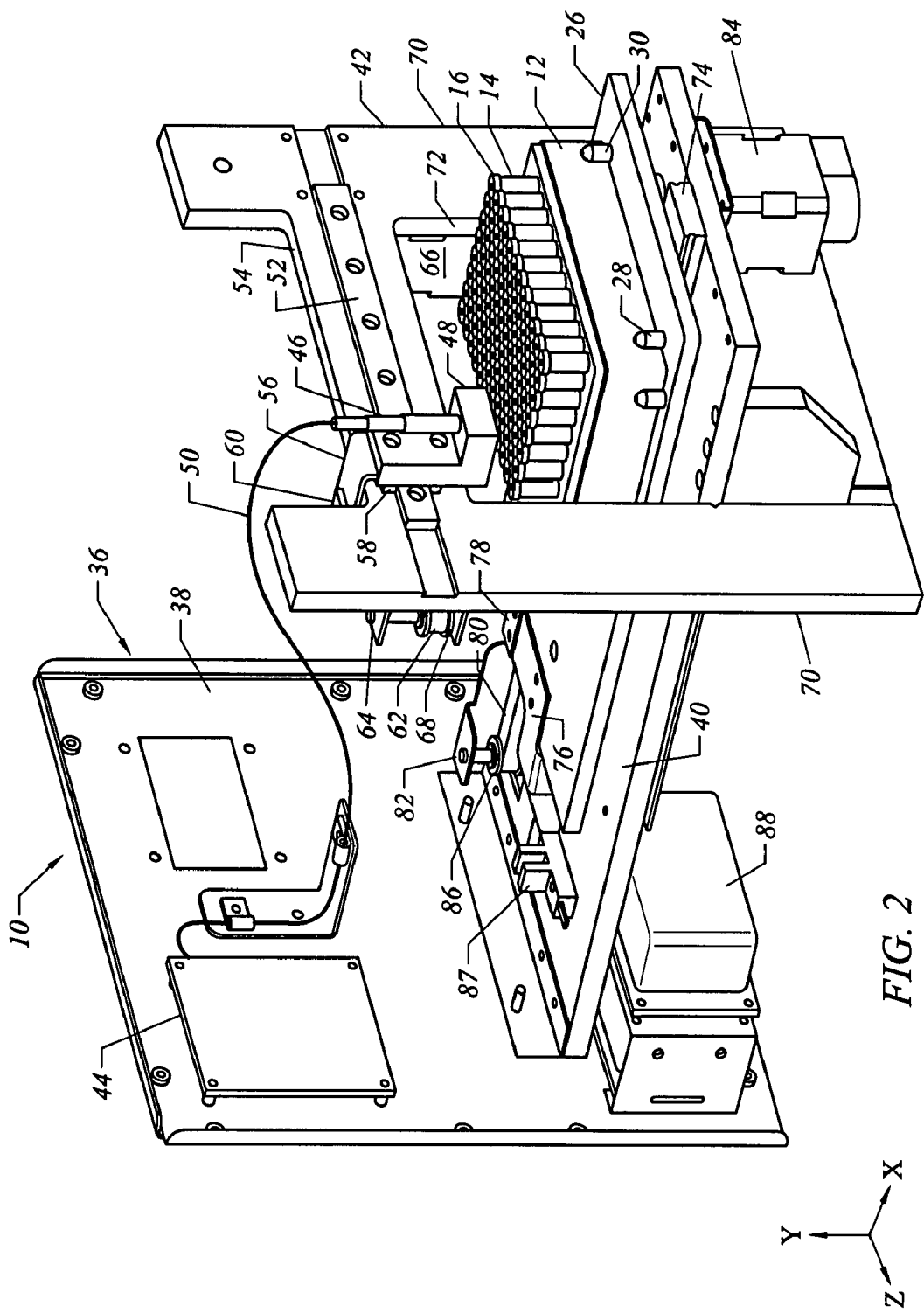
FIG. 2 is a perspective view of the ultrasonic test instrument of FIG. 1 with the housing removed.

Referring to FIG. 2, the test instrument 10 is shown with the housing 20 removed. The test instrument is constructed with a frame 36 having a back wall 38, a support bed or deck 40 and a front bridge structure 42. On the back wall 38 is a controller 44 that manages the operation of the instrument 10 and controls the data collection from an ultrasonic sensor 46 through an electronic connecting cable 50. The ultrasonic sensor 46 is seated in a holder 48 displaceably supported on a track 52 mounted to a cross member 54 of the bridge structure 42. The holder 48 has a bracket 56 with a slide 58 that engages the track 52 and an arm 60 that is connected to a belt 62 of a belt drive 64. The belt drive 64 has a drive motor 66 and guide spools 68 mounted to the vertical members 70 of the bridge structure 42 for transporting the ultrasonic sensor 46 back and forth across the cross member 54 under command of the controller 44.

The deck 40 is supported at one end by the back wall 38 and at the other end by the bridge structure 42. The deck 40 projects through an opening 72 in the bridge structure 42 and supports a carriage rail 74 on which the platform carrier 26 is slidably supported.

The platform carrier 26 has a bracket 76 fastened to the carrier 26 with an arm 78 connected to a belt 80 of a belt drive 82. The belt drive 82 has a drive motor 84 and guide spools 86 mounted to the deck 40 for transporting the platform carrier 26 forward and aft over the deck 40 and allowing the carrier 36 to be extended outside of the housing 20 as shown in FIG. 1. Appropriate sensors 87 (one shown) limit displacement and provide a reference point for calculating the position of the ultrasonic sensor 46 during operation. Typically, before operation all tube caps 16 are removed and a sequence of measurement is selected.

During operation, the power supply 88 is activated and the controller 44, under command of the associated computer 18, displaces the support carrier 26 fore and aft over the deck 40 and displaces the ultrasonic sensor 46 back and forth across the track 52 on the cross member 54 of the bridge structure. In this manner, the sensor can be selectively positioned over any and all tubes in a tube rack or wells in a well tray mounted on the support carrier 26. When appropriately positioned, the controller activates the sensor and retrieves a reading that is processed to provide a calculated volume of liquid in the measured container. This information is further processed and/or recorded as required by the user.

As noted in this specification, the cavities for the removable tubes contained in the rack or the fixed wells in the well plates or trays are not cylindrical, but usually have sloped sides and flat or rounded bottoms. However, the liquid volume can easily be calculated from an algorithm defining the cavity with surface height as the variable that is measured by the sensor. Greater accuracy is naturally provided by measuring each cavity when empty and subsequently measuring the cavities when filled. However, the cavities are typically uniform and, given the known or sensed depth of one cavity, the liquid height and, hence, volume can be determined by sensing the liquid level in the set of cavities of a given tube rack or well tray seated in the measuring device.

The measuring device can also be used for other operations, such as the automated check for caps, and for proper cap insertion as well as the absence of a tube or tubes in a rack.

In addition to the primary test for liquid volume in the tubes in a tube rack or wells in a well tray, the measuring device can be equipped with an auxiliary sensor to capture an image of each tube or well.

Figure 3:
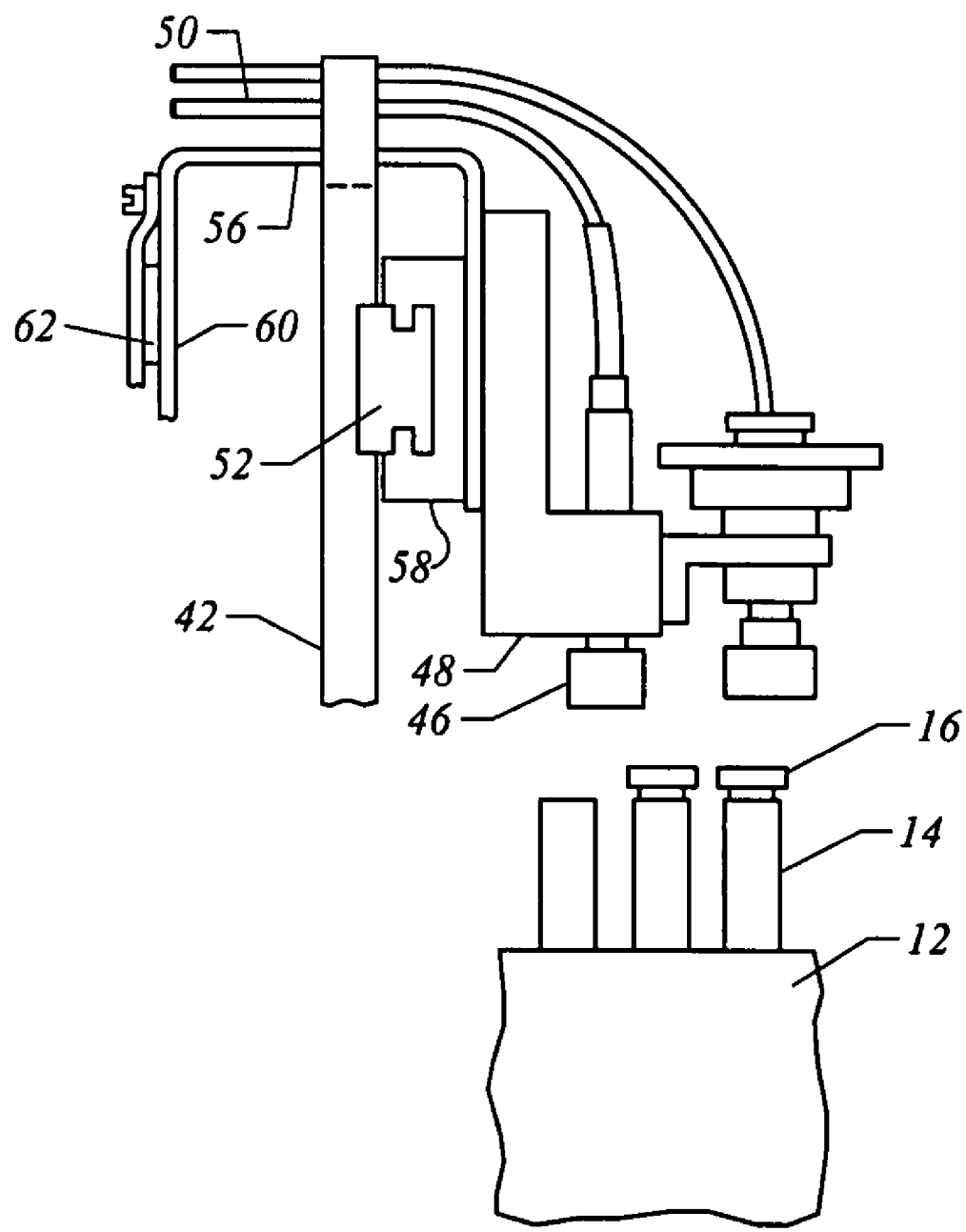
FIG. 3 is a partial side view of the ultrasonic test instrument of FIG. 2 with an added digital camera.

As shown in the partial side view of FIG. 3, the front bridge structure 42 supports the ultrasonic sensor holder 48 on a horizontal track 52 by a keyed slide 58. The slide 58 and sensor holder 48 are transported by the bracket 56 sandwiched between the slide 58 and holder 48. The bracket 56 has an extending arm 60 that is fastened to the belt 62 by a clamp 90. In this manner, the sensor holder 48 can be transported back and forth along the track 52 by the drive motor 66.

As shown in FIG. 3, by mounting a digital camera 92 in a camera bracket 94 fastened to the ultrasonic sensor holder 48, the same transport apparatus is utilized to move the camera 92 back and forth along the same track 52. The digital camera 92 is preferably a small CCD camera with an accompanying operating circuit board 94 that cooperates with the controller 44, and any additional processing circuitry on a board 96 under the deck 40. The control feedback and imaging data are transmitted through the cable 98 which electronically connects to the controller 44 and board 94.

Preferably, transport control for the digital camera 92 in both the X and Y directions is independent of the ultrasonic sensor 46 and utilizes a similar search and mapping routine to establish the size, number and layout of the tubes in a tube rack or cavities in a well tray. In a dedicated system that only operates for a specific size rack with a specific number of tubes, for example, the transport protocol can be combined with a known one row off-set for the camera with relation to the ultrasonic sensor by appropriate relative positioning of the camera and ultrasonic sensor.

The addition of the camera expands the capability of the system which can be varied by the software application programs typically processed in the auxiliary computer 18. For example, the camera can check any tube that the ultrasonic sensor detected having a cap or check a location the sensor detected to be empty. The camera can be used with a bar code processing program to identify tubes with bar code marked caps or identify bar code markings on racks or well trays. Additionally, the camera can be used as a visual verification of the contents of a tube or well cavity with the image stored for visual reference in association with the volumetric content of cavities.

The software application program is designed for user customization to tailor the automated operations with the laboratory procedures being implemented. The application program includes the customary data storage, visual display and reporting capabilities, typically required in managing multiple tube and well processing systems.

As previously noted, with a programmable procedure, the transport protocol can be varied by the operator with the sensors stopping at each cavity in a row before the platform is incrementally moved in or out or in a custom pattern devised by the operator.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

The invention claimed is:

1. An ultrasonic test instrument that measures the liquid level in grouped containers comprising:
   a support frame having an outer housing with a front having an opening;
   a displaceable platform carrier having a support structure that is adaptable to support a group of containers having a plurality of rows and a plurality of containers in each row such as a test tube rack or a well tray;
   a first displacement mechanism mounted on the support frame and connected to the displaceable platform carrier wherein a part of the displaceable platform carrier is transported in and out of the opening in the front of the housing in a forward and aft direction on operation of the first displacement mechanism;
   a displaceable sensor holder having an ultrasonic sensor supported in the holder;
   a second displacement mechanism mounted on the support frame over the displaceable platform carrier and connected to the displaceable sensor holder wherein the displaceable sensor holder and supported sensor are transported back and forth across the displaceable platform carrier in a back and forth direction on operation of the second displacement mechanism; and,
   a controller that electronically controls operation of the first displacement mechanism to move the platform carrier a selected distance in a forward or aft direction, that electronically controls operation of the second displacement mechanism to move the displaceable sensor holder a selected distance in the back or forth direction, and that electronically controls the ultrasonic sensor, wherein the sensor is moved over selected containers, such as sample tubes in a tube rack or sample wells in a well tray on the platform carrier for detecting the height of liquid in the tubes or wells.

2. The ultrasonic test instrument of claim 1 wherein the support frame has a deck and the first displacement mechanism has a rail mounted on the deck wherein the platform carrier is displaceable forward and aft on the rail, the first displacement mechanism having in addition a drive motor with a drive belt connected to the platform carrier, the drive motor being operated by the controller for select displacement of the platform carrier.

3. The ultrasonic test instrument of claim 2 wherein the support frame has a front bridge structure with a cross member and the second displacement mechanism has a horizontal track on the cross member of the bridge structure wherein the sensor holder is mounted on the track, the second displacement mechanism having in addition a drive motor with a drive belt connected to the sensor holder, the drive motor being operated by the controller for select displacement of the sensor holder back and forth across the track.

4. The ultrasonic test instrument of claim 3 wherein the sensor holder has a bracket with a slide that engages the track and an arm that is fastened to the drive belt.

5. The ultrasonic test instrument of claim 1 in combination with a programmable computer having an application program, the computer being electronically connected to the controller of the ultrasonic test instrument wherein the controller operates the first and second displacement mechanisms in accordance with the programmed application program.

6. The ultrasonic test instrument of claim 1 wherein the displaceable sensor holder has a digital camera in addition to the ultrasonic sensor.

7. The ultrasonic test instrument of claim 5 wherein the application program has image processing and volume calculating capabilities.

8. Automated laboratory apparatus for measuring the volume of liquid in cavities of multi-cavity sample collectors where the cavities are arranged in multiple rows, each row having multiple cavities comprising:
   a controller;
   a support frame having a first transport mechanism with a support platform for supporting a multi-cavity sample collector wherein the first transport mechanism is operated by the controller and transports the support platform back and forth in a first direction, and the support frame further having a second transport mechanism with a sensor holder having an ultrasonic sensor arranged over the support platform wherein the second transport mechanism is operated by the controller and transports the sensor holder back and forth in a second direction perpendicular to the first direction; and,
   a program that selectively operates and positions the support platform and the sensor holder for locating the sensor over a selected row and selected cavity in the selected row of a multi-cavity sample collector for collection and analysis of data to determine the volume of liquid in cavities of the multi-cavity sample collector seated on the support platform.

9. The automated laboratory apparatus of claim 8 wherein the sensor holder includes a digital camera wherein the program selectively operates and positions the digital camera for collection and analysis of data relating to the cavities of the multi-cavity sample container.

10. The automated laboratory apparatus of claim 8 in combination with a computer having an applications program.

11. An ultrasonic test instrument comprising:
   a support frame, having an outer housing with a front having an opening;
   a displaceable platform carrier, having a support structure that is adaptable to support a test tube rack or a well tray;
   a first displacement mechanism mounted on the support frame and connected to the displaceable platform carrier wherein a part of the displaceable platform carrier is transported in and out of the opening in the front of the housing on operation of the first displacement mechanism;
   a displaceable sensor holder having an ultrasonic sensor and a digital camera supported in the holder;
   a second displacement mechanism mounted on the support frame over the displaceable platform carrier and connected to the displaceable sensor holder wherein the displaceable sensor holder and supported sensor are transported back and forth across the displaceable platform carrier on operation of the second displacement mechanism; and, a controller that electronically controls operation of the first displacement mechanism, the second displacement mechanism, the ultrasonic sensor and the digital camera wherein the sensor and digital camera are moved over sample tubes in a tube rack or sample wells in a well tray on the platform carrier for selectively detecting the height of liquid in the selected tubes or wells or capturing an image of the selected tubes or wells.

12. Automated laboratory apparatus for measuring the volume of liquid in cavities of multi-cavity sample collectors comprising:

a controller;

a support frame having a first transport mechanism with a support platform for supporting a multi-cavity sample collector wherein the first transport mechanism is operated by the controller and transports the support platform back and forth in a first direction, and the support frame further having a second transport mechanism with a sensor holder having an ultrasonic sensor and a digital camera arranged over the support platform wherein the second transport mechanism is operated by the controller and transports the sensor holder back and forth in a second direction perpendicular to the first direction; and, a program that selectively operates and positions the ultrasonic sensor and digital camera for collection and analysis of data relating to the cavities of the multi-cavity sample container and to determine the volume of liquid in cavities of the multi-cavity sample collector that is seated on the support platform.

* * * * *